(12) United States Patent
Xia et al.

(10) Patent No.: US 9,130,691 B2
(45) Date of Patent: Sep. 8, 2015

(54) OPTICAL BURST SWITCHED NETWORK NODES

(71) Applicant: Verizon Patent and Licensing Inc., Basking Ridge, NJ (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 98 days.

(21) Appl. No.: 13/775,552

(22) Filed: Feb. 25, 2013

(65) Prior Publication Data

US 2014/0241721 A1    Aug. 28, 2014

(51) Int. Cl.
*H04J 14/00* (2006.01)
*H04B 10/20* (2006.01)
*H04J 14/02* (2006.01)
*H04Q 11/00* (2006.01)

(52) U.S. Cl.
CPC ............. *H04J 14/02* (2013.01); *H04J 14/0204* (2013.01); *H04J 14/0269* (2013.01); *H04J 14/0283* (2013.01); *H04Q 11/0066* (2013.01); *H04Q 2011/0073* (2013.01); *H04Q 2011/0092* (2013.01)

(58) Field of Classification Search
CPC .......... H04B 10/077; H04B 2210/075; H04B 10/075; H04B 10/275; H04J 14/0258; H04J 14/0267; H04J 14/0276; H04J 14/0201; H04J 14/0283; H04J 14/02; H04J 14/0204; H04J 14/0269; H04Q 2011/0092; H04Q 11/0066; H04Q 2011/0073; G02B 6/29383; G02F 2203/585

USPC ................................. 398/32, 45–83
See application file for complete search history.

(56) References Cited

U.S. PATENT DOCUMENTS

| | | | | |
|---|---|---|---|---|
| 5,161,153 A | * | 11/1992 | Westmore | 370/407 |
| 5,253,250 A | * | 10/1993 | Schlafer et al. | 370/392 |
| 5,289,302 A | * | 2/1994 | Eda | 398/51 |
| 5,369,515 A | * | 11/1994 | Majima | 398/59 |
| 5,418,785 A | * | 5/1995 | Olshansky et al. | 370/438 |
| 5,488,501 A | * | 1/1996 | Barnsley | 398/51 |
| 5,500,857 A | * | 3/1996 | Nakata | 370/440 |
| 5,600,466 A | * | 2/1997 | Tsushima et al. | 398/79 |
| 5,854,699 A | * | 12/1998 | Olshansky | 398/79 |
| 5,864,414 A | * | 1/1999 | Barnsley et al. | 398/71 |
| 5,912,753 A | * | 6/1999 | Cotter et al. | 398/54 |
| 5,956,165 A | * | 9/1999 | Fee et al. | 398/78 |
| 5,959,749 A | * | 9/1999 | Danagher et al. | 398/83 |
| 6,108,113 A | * | 8/2000 | Fee | 398/16 |
| 6,134,036 A | * | 10/2000 | Andreozzi et al. | 398/1 |

(Continued)

OTHER PUBLICATIONS

Yoo et al, Optical Packet and Burst Switching Technologies for the Future Photonic Internet, Dec. 2006, LTJ, vol. 24 Issue 12, pp. 4468-4492.*

*Primary Examiner* — Ken Vanderpuye
*Assistant Examiner* — Dibson Sanchez

(57) ABSTRACT

An optical node includes a wavelength splitter configured to split optical signals comprising multiple optical wavelengths into separate outputs, with each of the separate outputs having a different wavelength. The optical node further includes a detector configured to detect optical signals associated with packets at each of the separate outputs, and determine a modulation applied to the optical signals at each of the separate outputs. The optical node also includes a processing unit configured to identify destination optical nodes for the packets based on the determined modulation.

21 Claims, 17 Drawing Sheets

(56) References Cited

U.S. PATENT DOCUMENTS

| | | | |
|---|---|---|---|
| 6,272,154 B1* | 8/2001 | Bala et al. | 370/535 |
| 6,424,439 B1* | 7/2002 | King | 398/79 |
| 6,574,016 B1* | 6/2003 | Harley et al. | 398/79 |
| 6,718,141 B1* | 4/2004 | deVette | 398/82 |
| 6,754,450 B2* | 6/2004 | Chang et al. | 398/51 |
| 6,965,739 B2* | 11/2005 | Seto et al. | 398/183 |
| 6,968,131 B2* | 11/2005 | Obeda et al. | 398/34 |
| 7,184,666 B1* | 2/2007 | Li et al. | 398/83 |
| 7,258,723 B2* | 8/2007 | Crawley et al. | 95/5 |
| 7,421,199 B2* | 9/2008 | Bai | 398/30 |
| 7,499,652 B2* | 3/2009 | Zhong et al. | 398/83 |
| 7,577,358 B2* | 8/2009 | Barbosa et al. | 398/54 |
| 7,603,034 B2* | 10/2009 | Shen et al. | 398/25 |
| 7,660,326 B2* | 2/2010 | Shachar et al. | 370/458 |
| 7,689,121 B2* | 3/2010 | Peloso et al. | 398/58 |
| 7,761,011 B2* | 7/2010 | Gopinath | 398/155 |
| 8,265,480 B2* | 9/2012 | Shen | 398/32 |
| 8,385,349 B2* | 2/2013 | Yuang et al. | 370/395.2 |
| 2002/0089974 A1* | 7/2002 | Leme | 370/352 |
| 2003/0067651 A1* | 4/2003 | Wan et al. | 359/133 |
| 2003/0133641 A1* | 7/2003 | Yoo | 385/14 |
| 2003/0180044 A1* | 9/2003 | Mahlab | 398/32 |
| 2004/0062549 A1* | 4/2004 | Obeda et al. | 398/30 |
| 2004/0213572 A1* | 10/2004 | Doh et al. | 398/59 |
| 2006/0013584 A1* | 1/2006 | Miyazaki | 398/19 |
| 2006/0133811 A1* | 6/2006 | Gumaste et al. | 398/83 |
| 2006/0239684 A1* | 10/2006 | Oguma | 398/83 |
| 2007/0104483 A1* | 5/2007 | Carrick et al. | 398/32 |
| 2007/0242625 A1* | 10/2007 | Dunne et al. | 370/258 |
| 2007/0264011 A1* | 11/2007 | Sone et al. | 398/10 |
| 2007/0280700 A1* | 12/2007 | Remedios et al. | 398/183 |
| 2008/0138066 A1* | 6/2008 | Zhu et al. | 398/39 |
| 2013/0286847 A1* | 10/2013 | Schmidt et al. | 370/241 |
| 2014/0010543 A1* | 1/2014 | Lee, Kun-Jing | 398/79 |

* cited by examiner

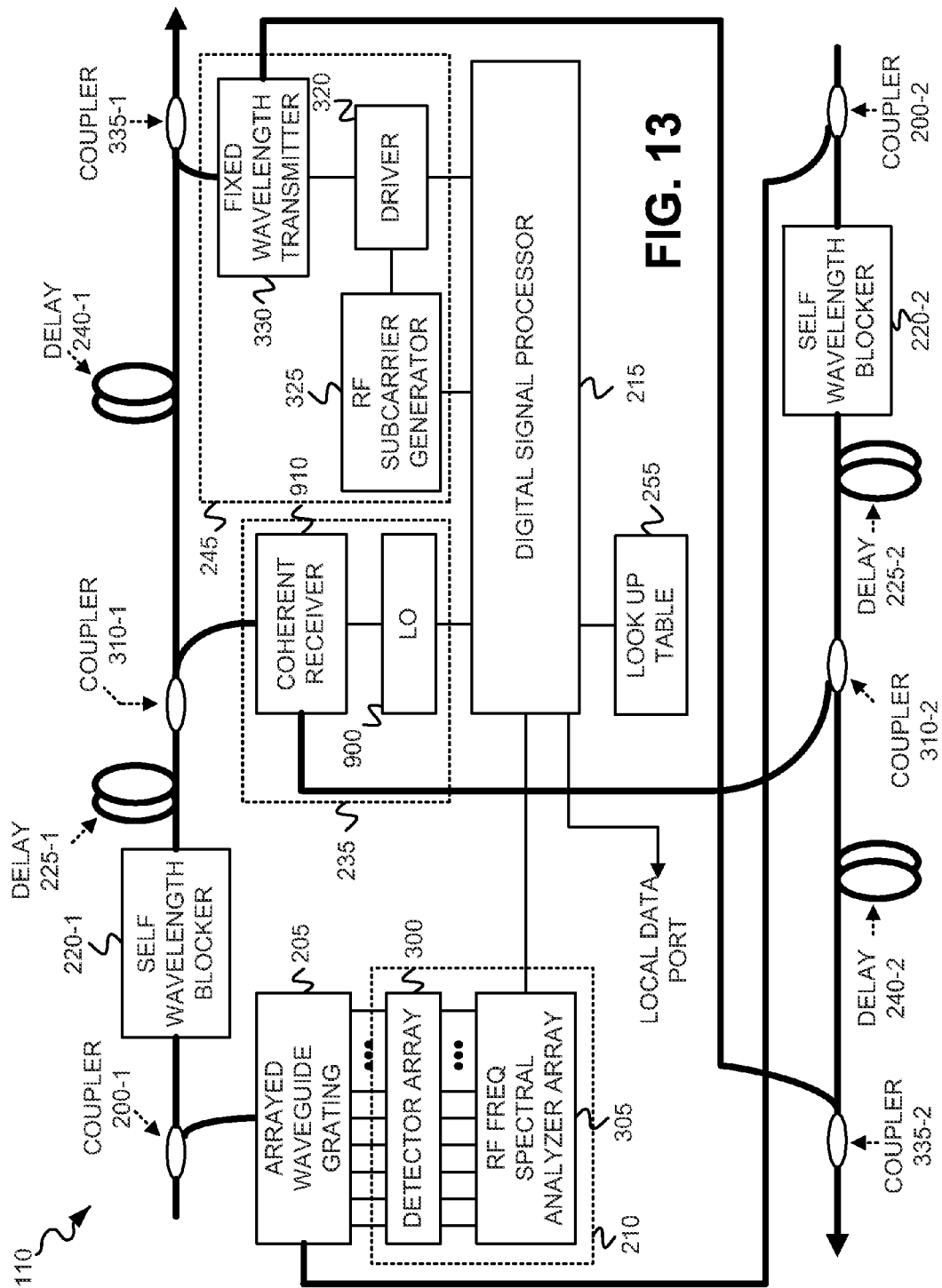

OPTICAL BURST SWITCHED NETWORK NODES

BACKGROUND

The next stage of evolution for packet handling networks will likely involve enhancing network efficiency and flexibility. Flexibility of a packet handling network can be realized by processing data packets optically, instead of electronically. One of the major characteristics of packet traffic is that the traffic involves bursts of packets, with traffic demand varying dramatically over time. Optical burst switched networks, which include packet handling optical nodes, have been designed to transmit bursts of packets via optical wavelengths over optical fiber.

BRIEF DESCRIPTION OF THE DRAWINGS

FIG. 13 depicts an exemplary implementation of an optical node, used in the network environment shown in FIGS. 12A and 12B, which has bidirectional capability;

DETAILED DESCRIPTION OF THE PREFERRED EMBODIMENTS

The following detailed description refers to the accompanying drawings. The same reference numbers in different drawings may identify the same or similar elements. The following detailed description does not limit the invention as claimed.

Exemplary embodiments described herein relate to optical nodes, for use in optical networks, which each include a fixed wavelength transmitter where modulation is applied to the transmitter output signals based on the destination node to which the output signals are being sent. Therefore, optical nodes described herein include functionality for explicitly identifying destination nodes for each outgoing packet based on modulation applied to the fixed wavelength transmitter output optical signals. In an implementation described herein, the modulation applied to the output optical signals may include radiofrequency (RF) modulation, such as, for example, RF sinusoidal signals of specific rates. For example, node A may apply a modulating RF signal of 10 MHZ to a fixed wavelength optical output signal to designate node B as the destination of the optical signals. A receiving optical node, when receiving the optical signals sent across the optical network, may identify the modulation applied to the optical signals to determine whether the current node, or another node in the network, is the destination node for the corresponding packet. The exemplary implementations of the optical node described herein permit direct packet processing at the optical layer, use simple and low cost RF sinusoidal signals to mark packets with destination node identifiers, and require no centralized scheduling. Additionally, the exemplary implementations described herein avoid packet collisions, do not impact network optical amplifier performance, and permit any-node-to-any-node packet traffic transmission in an optical network.

Figure 1:
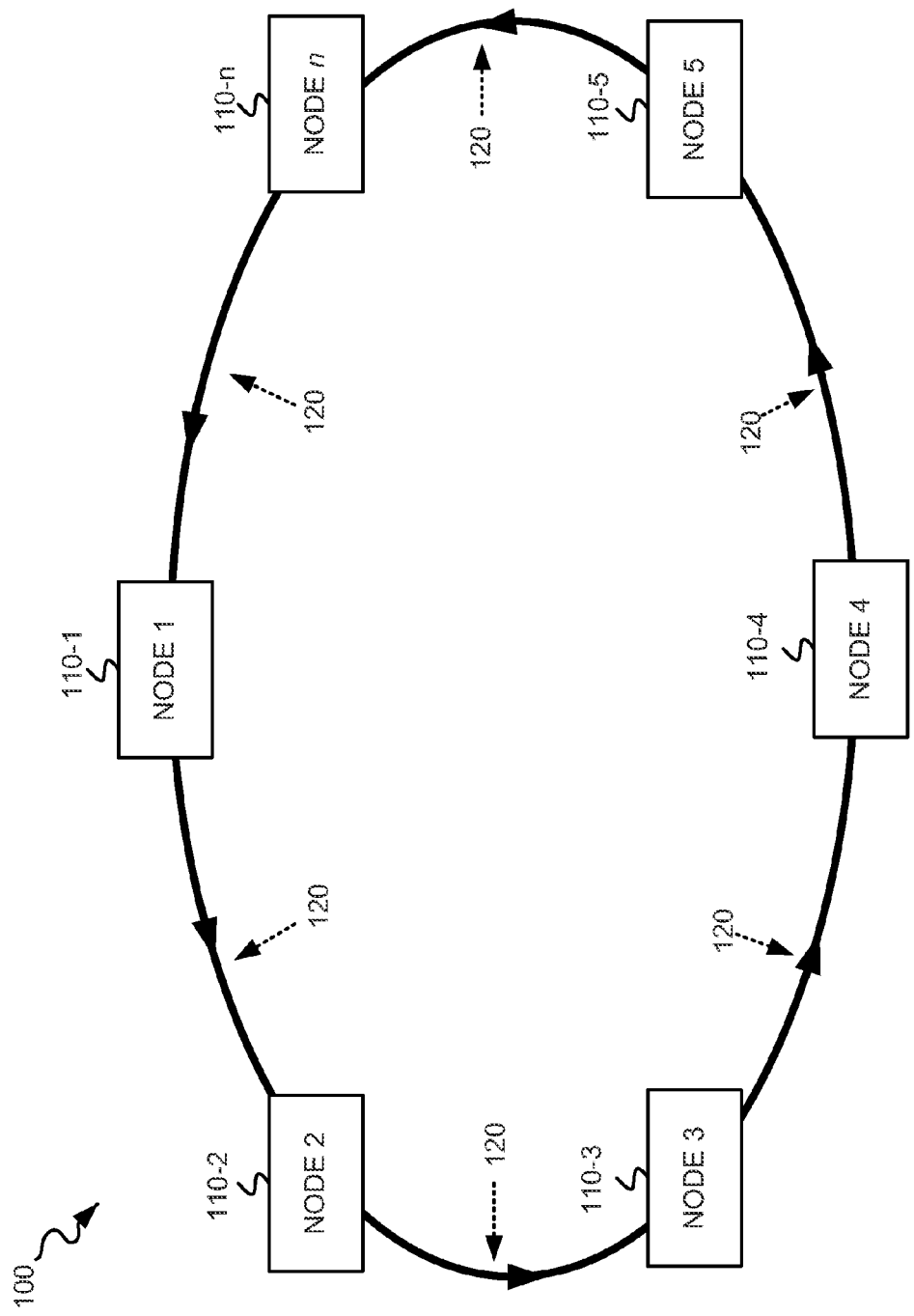
FIG. 1 illustrates an exemplary network environment in which optical nodes may transmit packets to one another via optical bursts.

FIG. 1 illustrates an exemplary network environment 100 in which optical nodes may transmit packets to one another via optical signal bursts. Network environment 100 may include multiple optical nodes 110-1 through 110-*n* (collectively referred to herein as "nodes 110," or individually and generically referred to herein as "node 110") connected in, for example, an optical ring network configuration via multiple optical fibers 120. Each optical node 110 connects with a next optical node 110 in the optical network via an optical fiber 120, and packets may be transmitted around the network in the direction shown by the arrows in FIG. 1 via the optical fibers 120. Optical nodes 110 may include destination node identifying information when transmitting each packet using optical signal bursts such that intervening optical nodes 110, and the eventual destination optical node 110, can ascertain whether a received packet is destined for a current optical node or for another optical node in the optical network. Optical nodes 110 are described in further detail below.

The configuration of network components of network environment 100 shown in FIG. 1 is for illustrative purposes. Other configurations may be implemented. Therefore, network environment 100 may include additional, fewer and/or different components, that may be configured in a different arrangement, than that depicted in FIG. 1.

Figure 2:
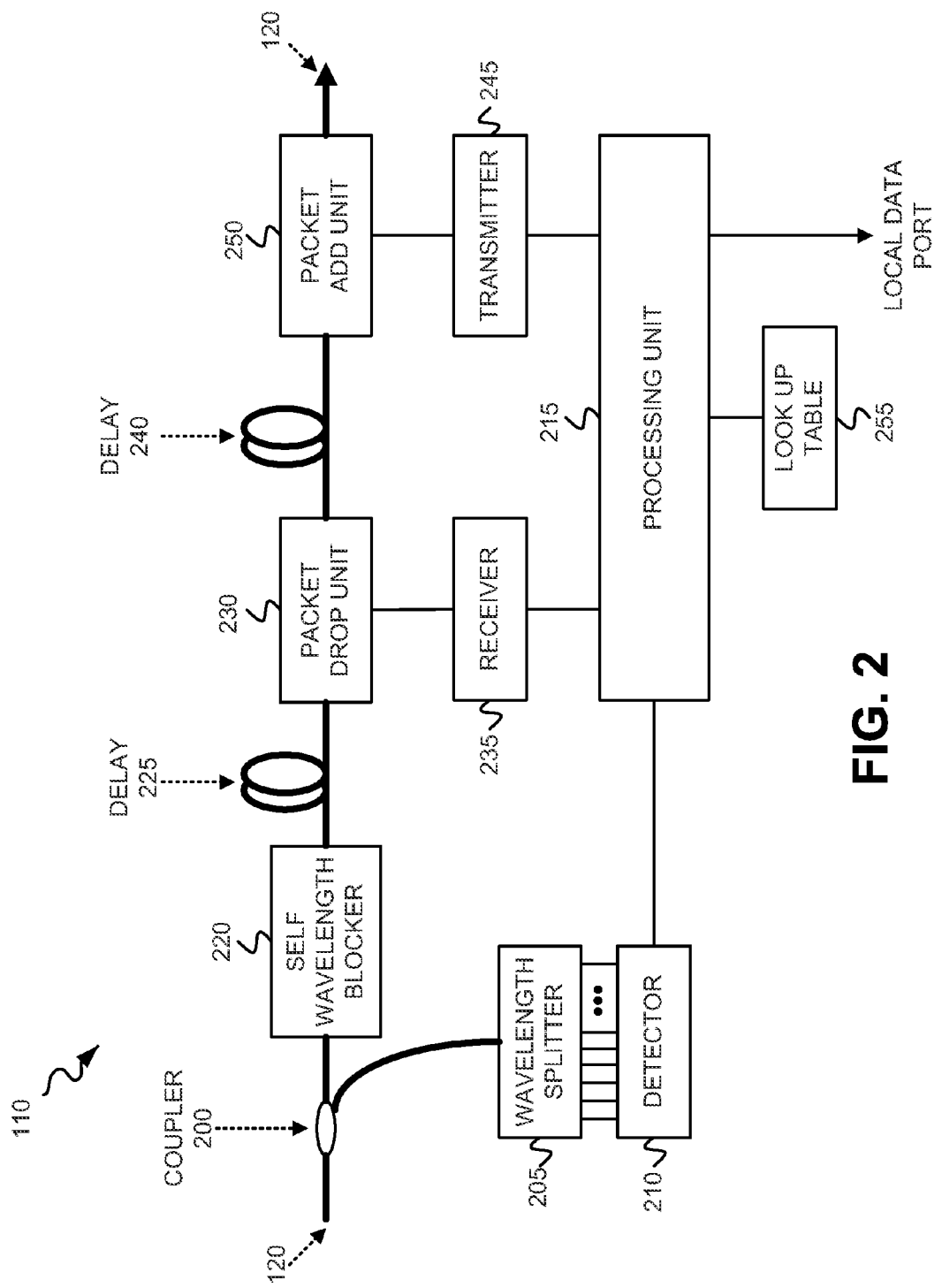
FIG. 2 depicts an optical node of FIG. 1 according to an exemplary implementation.

FIG. 2 depicts an optical node 110 according to a first exemplary implementation. As shown, optical node 110 may include a coupler 200, a wavelength splitter 205, a detector 210, a processing unit 215, a self wavelength blocker 220, a fiber delay 225, a packet drop unit 230, a receiver 235, a fiber delay 240, a transmitter 245, a packet add unit 250, and a took up table 255.

Coupler 200 connects to an input optical fiber (i.e., optical fiber 120—shown to left of coupler 200 in FIG. 2) to receive optical signals sent over the optical fiber. The optical signals may be received via multiple different optical wavelengths during multiple sequential timeslots, with the optical signals transmitted during a given timeslot corresponding to a block of packets (e.g., a block of at least one packet). Coupler 200 splits the optical signal into duplicate optical signals, with one of the optical signals being sent to self wavelength blocker 220 and the other of the optical signals being sent to wavelength splitter 205. The optical signals received at coupler 200 may include optical signals transmitted at multiple different optical wavelengths.

Wavelength splitter 205 may split the multiple different optical wavelengths received at coupler 200 into separate optical outputs, with each output having a different wavelength/frequency. Wavelength splitter 205 may connect the separate outputs to detector 210. For example, coupler 200 may receive optical signals over the optical fiber having frequencies of 193.1 THz, 193.2 THz 193.3 THz, 193.4 THz, 193.5 THz, 193.6 THz, 193.7 THz, and 193.8 THz. Other wavelengths/frequencies may be used. Coupler 200 may supply each of the optical wavelengths/frequencies via a separate output to detector 210. Each of the wavelengths received at wavelength splitter 205 may correspond to an optical node 110 that is the source of the optical signals sent at the wavelength. For example, optical signals sent at a frequency of 193.1 THz may be sent from node 1 110-1, optical signals sent at a frequency of 193.2 THz may be sent from node 2 110-1, etc.

Detector 210 may receive the separate wavelengths from wavelength splitter 205 and may detect modulation applied to each of the optical signals of the separate wavelengths. In one implementation, the modulation may include a RF modulation applied to the optical signals. The RF modulation may include, for example, a high frequency sinusoidal signal (e.g., 10-100 MHz) applied to modulate the optical signal. Processing unit 215 may use index look up table 255 with the modulation detected by detector 210 to determine a destination optical node for a respective optical signal. For example, a RF modulation of 10 MHz may designate node 1 110-1 as a destination node for a packet, a RF modulation of 20 MHz may designate node 2 110-2 as a destination node for the corresponding packet, a RF modulation of 30 MHz may designate node 3 110-3 as a destination node for the corresponding packet, etc.

Processing unit 215 may, based on a determination of whether optical signals during a given time slot are destined for the local optical node 110 (or other optical nodes 110), control receiver 235 to receiver optical signals over the time slot and convert the optical signals into digital data. Processing unit 215 may further control transmitter 245 to convert output digital data (e.g., an output packet) into transmitted optical signals that can be added to output optical fiber by packet add unit 250. Transmitter 245 may modulate the output optical signals to designate a destination node for the corresponding packet.

Self wavelength blocker 220 may block (e.g., filter out) optical signals that comprise an optical wavelength/frequency that is assigned to the current optical node 110. For example, if transmitter 250 of node 110 transmits only at 193.1 THz, then self wavelength blocker 220 may block all optical signals at 193.1 THz. Self wavelength blocker 220 may further block idle packets (i.e., packets having no applied modulation for designating a destination node) from transiting to fiber delay 225 and packet drop unit 230.

Fiber delay 225 delays optical signals received via self wavelength blocker 220 for a configurable period of time. The configurable period of time ensures that processing unit 215 has processed the node identifying information retrieved from a packet by detector 210 prior to the optical signals associated with the packet reaching packet drop unit 230.

Packet drop unit 230 receives optical signals corresponding to packets and sends the optical signals to packet add unit 250 via fiber delay 240. Packet drop unit 230 also couples the optical signals corresponding to the packets to receiver 235. Receiver 235 receives the optical signals from packet drop unit 230 and converts those optical signals to electrical (e.g., digital) signals that can be processed by processing unit 215. Fiber delay 240 delays optical signals received from packet drop unit 230 for a configurable period of time.

Transmitter 245 receives control signals from processing unit 215 and generates modulated optical signals for output to packet add unit 250 based on the control signals. For example, if node 110 is assigned a transmit frequency of 193.8 MHz, then transmitter 245 modulates the optical carrier frequency of 193.8 MHz with a modulating signal (e.g., an RF modulating signal) that designates the packet's destination optical node 110.

Packet add unit 250 couples optical signals received via fiber delay 240, and from transmitter 245, to the output optical fiber of optical node 110. Look up table 255 stores data that links transmit optical frequencies/wavelengths with packet source optical node identifiers, and further links transmission modulations with packet destination optical node identifiers. For example, look up table 255 may link a transmit optical frequency of 193.1 THz with optical node 110-1, a transmit optical frequency of 193.2 THz with optical node 110-2, etc. Look up table 255 may further link a 10 MHz RF modulation with optical node 110-1, a 20 MHz RF modulation with optical node 110-2. Processing unit 215 may perform a look up into table 255 to identify a source optical node of a packet (i.e., by the transmission optical frequency) and a destination optical node of the packet (i.e., by the applied RF modulation), The configuration of components of optical node 110 illustrated in FIG. 2 is for illustrative purposes. Other configurations may be implemented. Therefore, optical node 110 may include additional, fewer and/or different components than those depicted in FIG. 2. The various components of optical node 110 of FIG. 2 have been described as performing certain operations or functions. However, any component of optical node 110 in FIG. 2 may be capable of performing the operations or functions described as being performed by other components of optical node 110.

Figure 3:
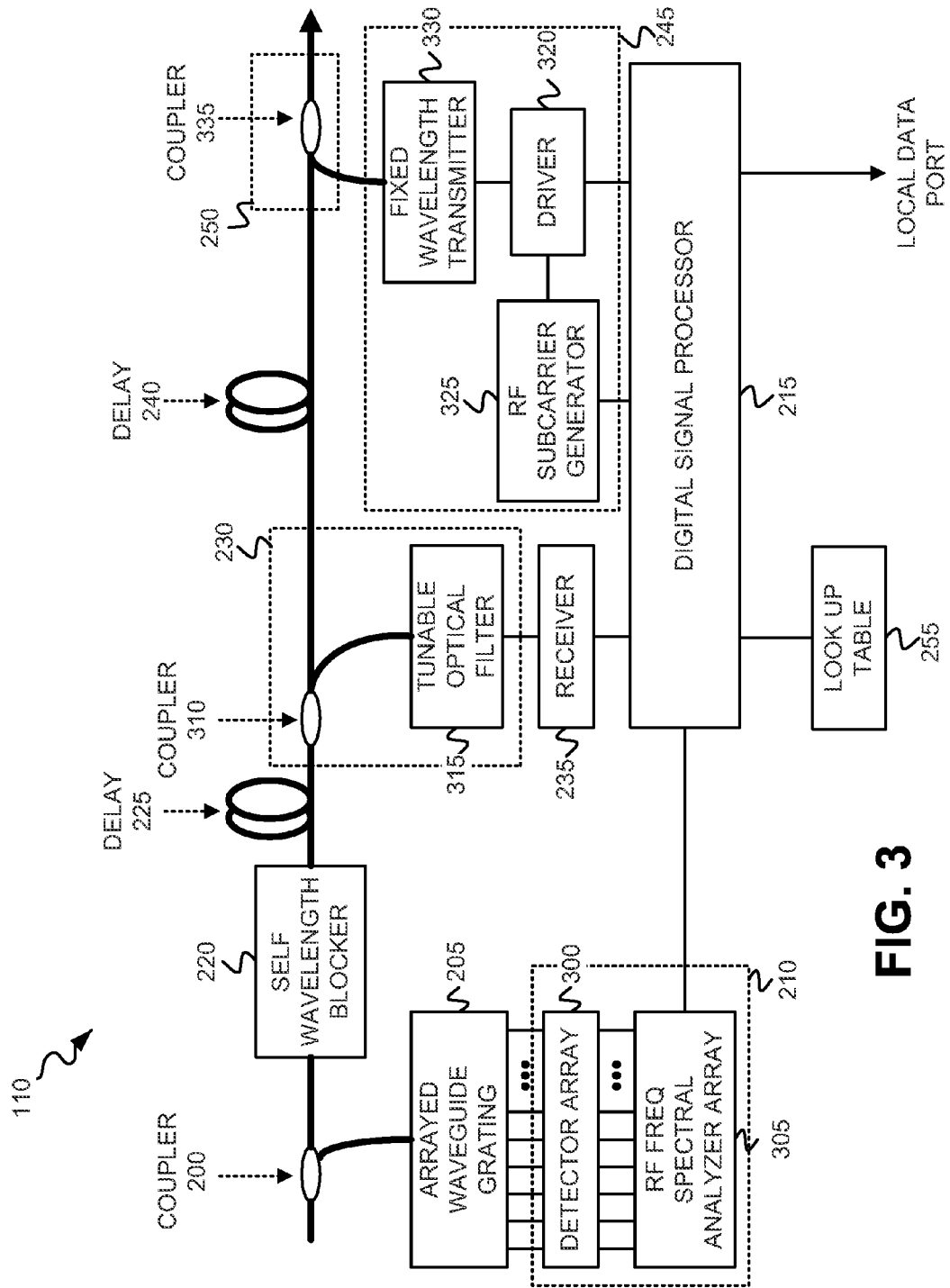
FIG. 3 depicts details of the optical node of FIG. 2 according to another exemplary implementation.

FIG. 3 depicts details of optical node 110 of FIG. 2 according to a second exemplary implementation. As shown in FIG. 3, wavelength splitter 205 includes an arrayed waveguide grating 205, detector 210 includes a detector array 300 and a RF frequency spectral analyzer array 305, packet drop unit 230 includes a coupler 310 and a tunable optical filter 315, transmitter 245 includes a driver 320, an RF subcarrier generator 325 and a fixed wavelength transmitter 330, and packet add unit 250 includes a coupler 335. Processing unit 215, in the implementation of FIG. 3, further comprises a digital signal processor. The remaining components depicted in FIG. 3 operate similarly to the description set forth above with respect to FIG. 2, except as given below.

Arrayed waveguide grating 205 includes a grating that splits the multiple optical wavelengths received from coupler 200 into separate wavelength/frequency outputs (e.g., one wavelength/frequency per output). Detector array 300 receives optical signals via the separate wavelengths and extracts the modulation signal from the optical carrier signal. Detector array 300 supplies the extracted modulation signal for each detected wavelength/frequency to RF frequency spectral analyzer array 305 which, in turn, determines an RF frequency associated with each modulation signal. For example, if packets are received at coupler 200 comprising a 193.1 THz carrier signal modulated by a 10 MHz modulation signal, and a 193.3 THz carrier signal modulated by a 80 MHz modulation signal, then waveguide grating 205 may split the incoming signals into separate wavelengths/frequencies corresponding to 193.1 THz and 193.3 THz, and detector array 300 may extract the 10 MHz modulation signal from the 193.1 carrier signal and the 80 MHz modulation signal from the 193.3 THz carrier signal. Detector array 300 may supply the extracted modulation signals from each of the carrier signals to RF frequency spectral analyzer array 305. Analyzer array 305 analyzes the modulation signals to determine the RF frequencies that can be used to identify a destination of the corresponding packet, and supplies the determined RF frequencies as digital data to digital signal processor 215.

Coupler 310 of packet drop unit 230 couples optical signals received via fiber delay 225 to tunable optical filter 315 and to fiber delay 240. Tunable optical filter 315 tunes its optical filters to pass wavelengths as determined by digital signal processor 215 based on modulations determined by analyzer array 305. For example, if digital signal processor 215 determines that the RF modulation determined by analyzer array 305 corresponds to the packet being destined for the current optical node 110, then digital signal processor 215 causes tunable optical filter 315 to tune to the appropriate wavelength of the packet such that receiver 235 can detect the optical signals corresponding to the packet and convert the optical signals to electrical (e.g., digital) signals.

Driver 320 of transmitter 245 receives control signals from digital signal processor 215 to cause driver 320 to output appropriate drive signals to fixed wavelength transmitter 330. The signals applied from driver 320 to wavelength transmitter 330 cause transmitter 330 to transmit optical carrier signals with modulation supplied by RF subcarrier generator 325. RF subcarrier generator 325 may generate a modulation based on control signals from digital signal processor 215 that selects an appropriate modulation based on the optical node 110 to which the packet is destined. For example, if fixed wavelength transmitter 330 of optical node 110 transmits at 193.7 THz, and a given packet is destined for node 5 110-5, then RF subcarrier generator 325 may generate an RF signal of 50 MHz and apply that RF signal to driver 320. Driver 320, in turn, will cause fixed wavelength transmitter 330 to output a 193.7 THz carrier signal modulated by a 50 MHz subcarrier signal. Coupler 335 of packet add unit 250 couples the optical signals transmitted by fixed wavelength transmitter 330 to the output optical fiber (shown to the right of coupler 335 in FIG. 3).

Figure 4:
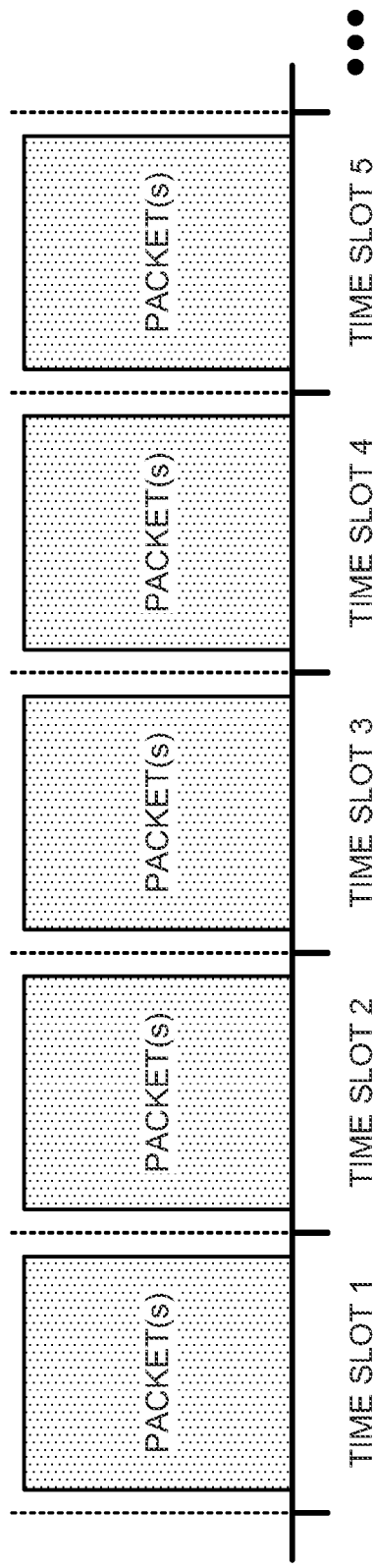
FIG. 4 depicts a simplified representation of packets transmitted over the optical ring network of FIG. 1 in sequential time slots.

FIG. 4 depicts a simplified representation of packets transmitted over an optical network an optical ring network as shown in FIG. 1) in sequential time slots. As shown in FIG. 4, multiple time slots may occur sequentially (e.g., time slot 1, time slot 2, time slot 3, etc.), with each time slot having an equal duration as every other time slot. In one implementation, each time slot may comprise 10 microseconds. A block of packets (e.g., one or more packets) may be transmitted during each time slot from one or more different optical nodes 110. For example, node 1 110-1 and node 2 110-2 may each transmit a packet during time slot 1, with the transmission time of the optical signals comprising the packet equaling approximately 8-9 microseconds.

Figure 5A:
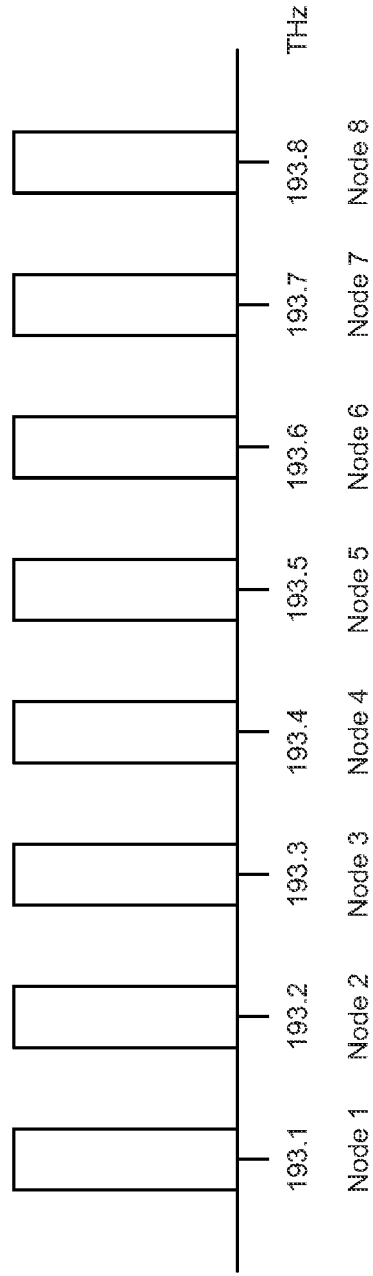
FIG. 5A depicts a graphical representation of frequencies associated with each fixed wavelength transmitter of the transmitter of the optical node of FIG. 3.

FIG. 5A depicts a graphical representation of frequencies associated with each fixed wavelength transmitter 330 of transmitter 245 of optical nodes 110-1 through 110-8 (i.e., nodes 1-8). Each optical node 110 in the optical network may transmit at a different optical wavelength/frequency. For example, as shown in FIG. 5A, Node 1 transmits at 193.1 THz, node 2 transmits at 193.2 THz, node 3 transmits at 193.3 THz, node 4 transmits at 193.4 THz, etc.

Figure 5B:
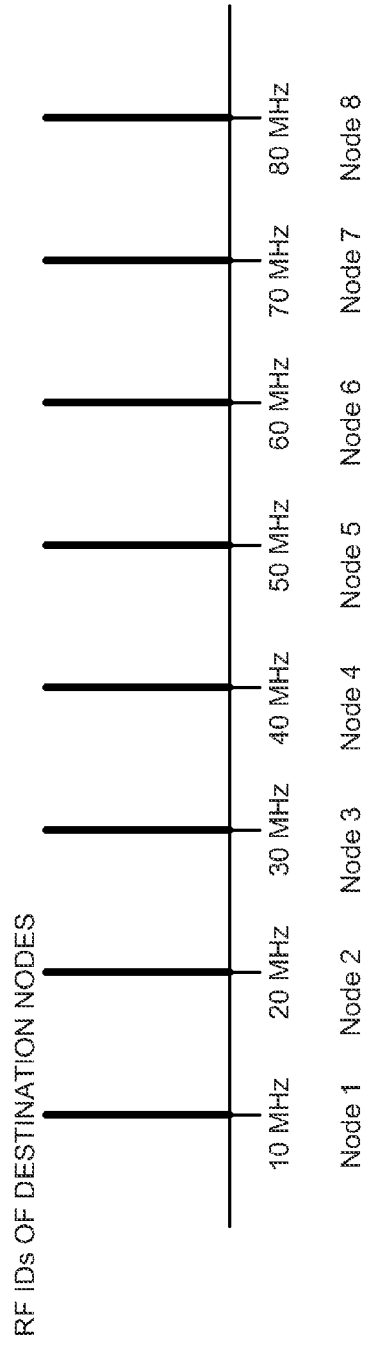
FIG. 5B depicts a graphical representation of radiofrequency modulation frequencies associated with each of the optical nodes of FIG. 1 when they are designated as a destination node for a packet.

FIG. 5B depicts a graphical representation of RF modulation frequencies associated with each of optical nodes 110-1 through 110-*n* when they are designated as a destination node for a packet. The RF modulation frequencies, therefore, represent an identifier for a destination optical node 110 for each transmitted packet. As shown in FIG. 5B, each optical node 110 in the optical network may be designated as a destination node based on RF modulation applied to the optical carrier frequency of the optical signals for the packet intended for that destination node. For example, node 1 has an RF modulation identifier of 10 MHz, node 2 has an RF modulation identifier of 20 MHz, node 3 has an RF modulation identifier of 30 MHz, node 4 has an RF modulation identifier of 40 MHz, etc.

Figure 6:
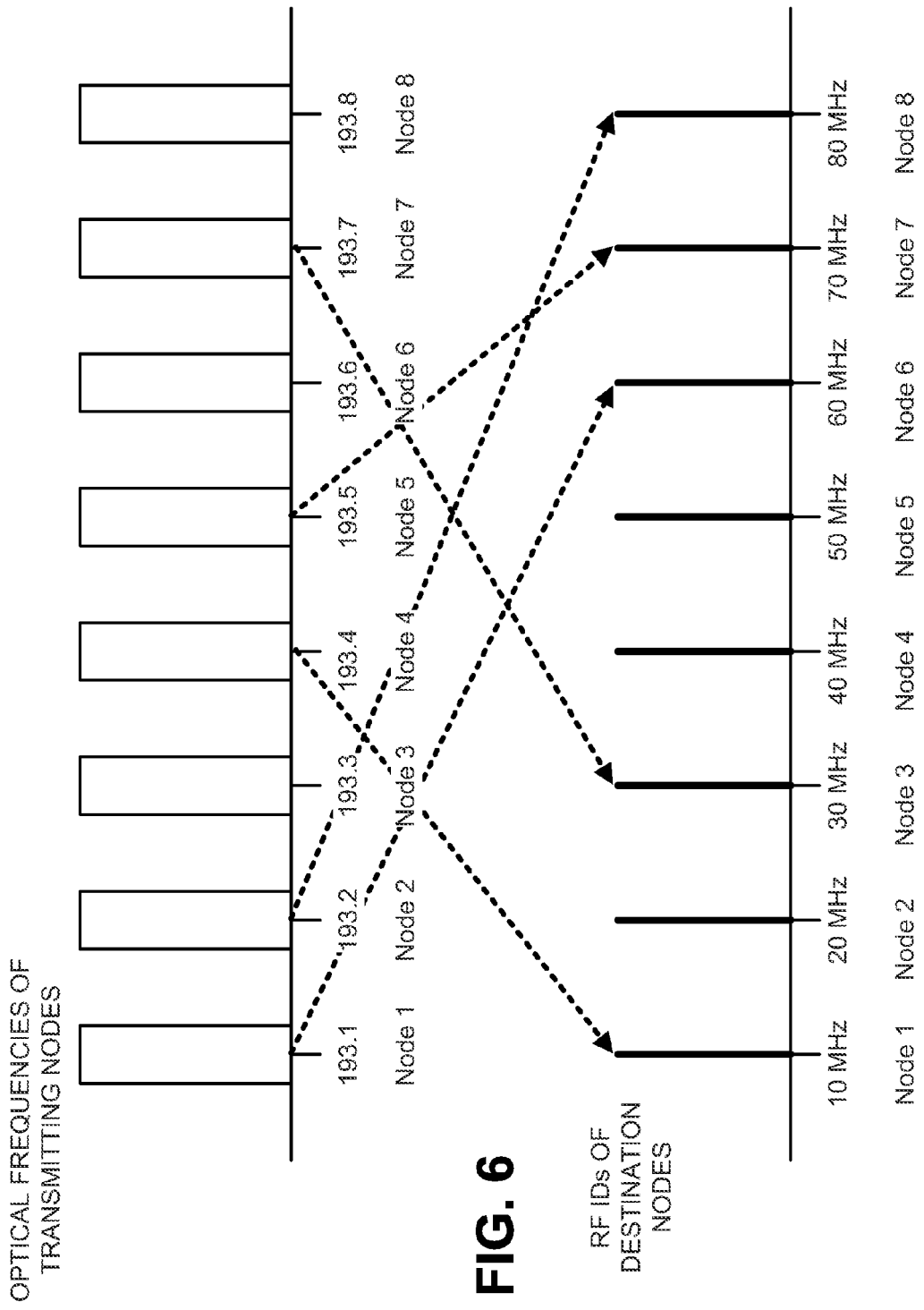
FIG. 6 depicts examples of the transmission of packets from source optical nodes to destination optical nodes using the node carrier frequency assignments shown in FIG. 5A and the node radiofrequency modulation identifier assignments shown in FIG. 5B.

FIG. 6 depicts examples of the transmission of packets from transmitting optical nodes 110 to destination optical nodes 110 using the node carrier frequency assignments shown in FIG. 5A and the node RF modulation identifier assignments shown in FIG. 5B. For example, as shown, Node 1 may transmit at an optical carrier frequency of 193.1 THz with a 60 MHz RF modulation identifier. The 193.1 THz optical frequency identifies the optical signals for the packet as originating from node 1, and the 60 MHZ RF modulation identifier identifies node 6 as the destination optical node for the packet.

In another example shown in FIG. 6, node 2 may transmit at an optical carrier frequency of 193.2 THz with a 80 MHz RF modulation identifier. The 193.2 THz optical frequency identifies the optical signals for the packet as originating from node 2, and the 80 MHz RF modulation identifier identifies node 8 as the destination optical node for the packet.

In a further example shown in FIG. 6, node 4 may transmit at an optical carrier frequency of 193.4 THz with a 10 MHz RF modulation identifier. The 193.4 THz optical frequency identifies the optical signals for the packet as originating from node 4, and the 10 MHz RF modulation identifier identifies node 1 as the destination optical node for the packet.

In yet another example shown in FIG. 6, node 5 may transmit at an optical carrier frequency of 193.5 THz with a 70 MHz RF modulation identifier. The 193.5 THz optical frequency identifies the optical signals for the packet as originating from node 5, and the 70 MHz RF modulation identifier identifies node 7 as the destination optical node for the packet.

in an additional example shown in FIG. 6, node 7 may transmit at an optical carrier frequency of 193.7 THz with a 30 MHz RF modulation identifier. The 193.7 THz optical frequency identifies the optical signals for the packet as originating from node 7, and the 30 MHz RF modulation identifier identifies node 3 as the destination optical node for the packet.

Figure 7:
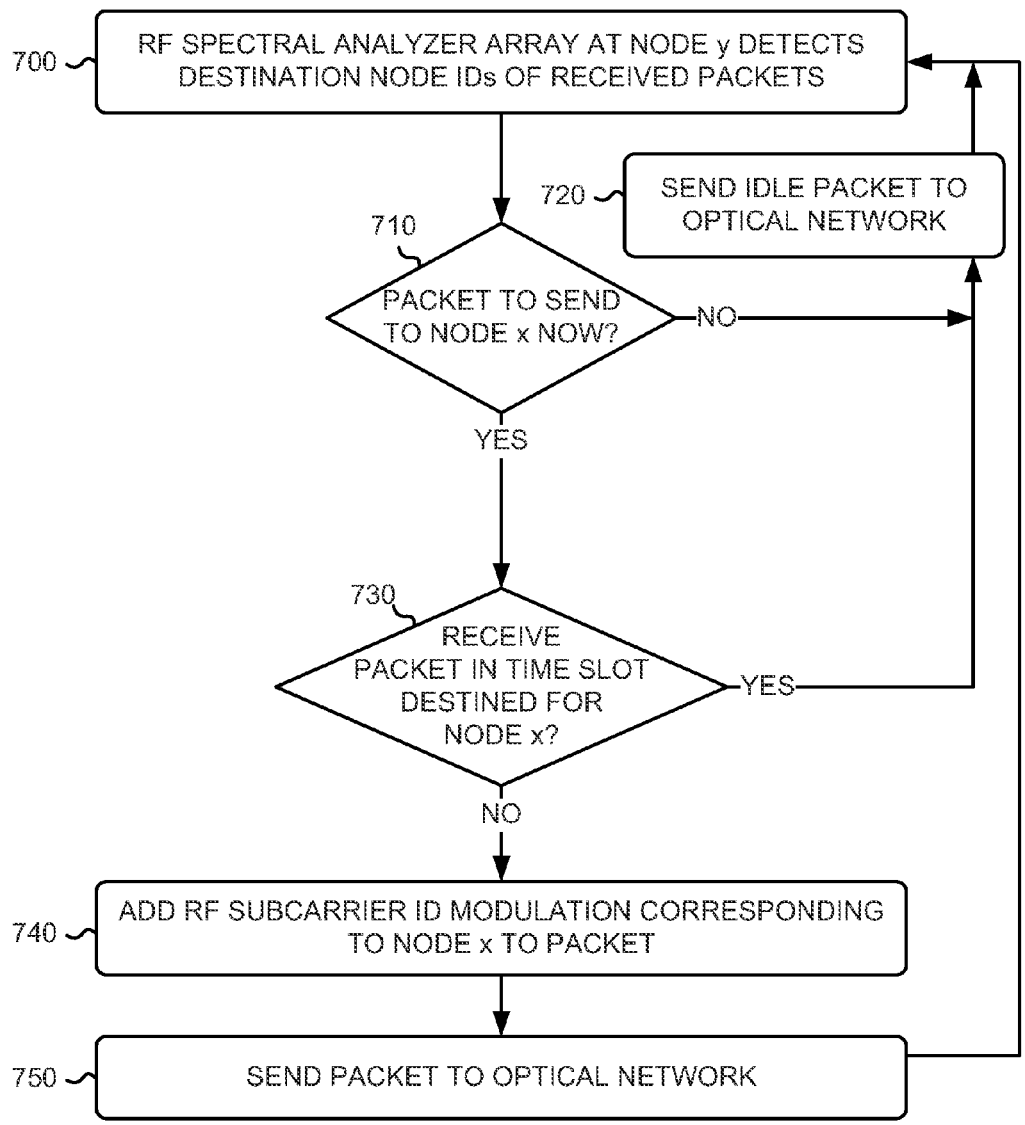
FIG. 7 is a flow diagram of an exemplary process for transmitting packets at an optical node of FIG. 1.

FIG. 7 is a flow diagram f an exemplary process for transmitting packets at an optical node 110. The exemplary process of FIG. 7 may be implemented by components of optical node 110 during a current time slot.

The exemplary process may include RF spectral analyzer array 305 at optical node 110 (node y) detecting the destination node IDs of received packets (block 700) during a current time slot. Optical signals associated with a packet may be received at optical node 110 during a time slot and supplied to wavelength splitter 205 via coupler 200. Detector array 300 may detect the optical signals and convert the optical signals from optical signals to electrical signals. RF frequency spectral analyzer array 305 may analyze the converted electrical signals to determine the RF subcarrier modulation applied to the carrier frequency. The detected RF subcarrier modulation represents the destination node IDs of the received packets. RF frequency spectral analyzer array 305 may provide the determined RF subcarrier modulation to processing unit 215 which, in turn, may perform a look up operation into look up table 255 to map the determined RF subcarrier modulation to a destination optical node of optical nodes 110-1 through 110-n.

Processing unit 215 may determine if there is a packet made available during the current time slot to send to another optical node (node x) (block 710). The packet may be generated internally in optical node y (e.g., an administrative packet), or may be generated externally (e.g., by a user of optical node y) and entered manually for transmission to another optical node. If there is no packet available to send to another node x (NO—block 710), then node y 110 may send an idle packet to the optical ring network (block 720) and the exemplary process may return to block 700 with the occurrence of a next time slot. Processing unit 215 may instruct RF subcarrier generator 325 and driver 320 to apply RF modulation to the optical signals output by fixed wavelength transmitter 330, with the absence of RF modulation indicating an idle packet at a subsequent receiving optical node 110. Fixed wavelength transmitter 330 may transmit the optical signals associated with the idle packet at a single optical frequency/wavelength that is assigned to node y.

If there is a packet available to send to node x in the current time slot (YES—block 710), then node y 110 may determine if a packet has been received via the external optical fiber and the optical network, in the current time slot, that is destined for node x (block 730). Node y may receive a packet during the time slot from another optical node 110 connected to the optical network. Receipt of a packet from another optical node 110 destined for node x "blocks" node y from sending a packet to node x during the current time slot. If a packet has been received from another optical node in the current time slot that is destined for node x (YES—block 730), then the exemplary process may continue at block 720 with the sending of an idle packet to the optical ring network. If a packet has not been received in the current time slot destined for node x via the external optical fiber (NO—block 730), then node y may add RF subcarrier modulation corresponding to node x to the outgoing packet (block 740) and send the packet to the optical ring network (block 750). The exemplary process may return to block 700 with the occurrence of a next time slot. If processing unit 215 determines that no packets have been received during the current time slot destined for node x from the external optical fiber, then processing unit 215 may instruct RF subcarrier generator 325 and driver 320 to apply the appropriate RF modulation to the optical signals transmitted from fixed wavelength transmitter 330 for the packet destined for node x. The exemplary process of FIG. 7 may be repeated at optical node 110 for each time slot in a sequence of time slots.

Figure 8:
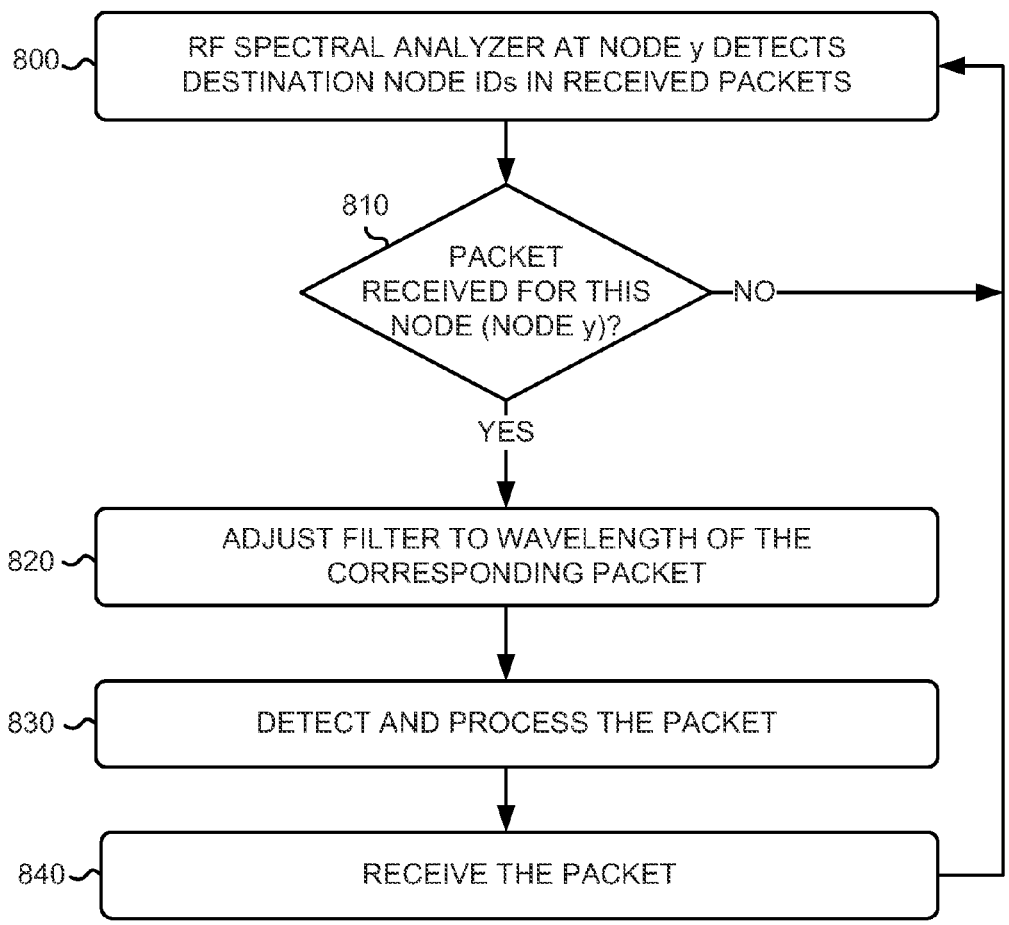
FIG. 8 is a flow diagram of an exemplary process for receiving packets at an optical node of FIG. 1.

FIG. 8 is a flow diagram of an exemplary process for receiving packets at an optical node 110. The exemplary process of FIG. 8 may be implemented by components of optical node 110 during a current time slot. The exemplary process of FIG. 8 is described below with respect to the exemplary implementation of optical node 110 depicted in FIG. 3.

The exemplary process may include RF spectral analyzer array 305 of detector 210 of optical node 110 (node y) detecting node IDs in received packets (block 800) during a current time slot. Optical signals associated with packet may be received at optical node 110 during a time slot and supplied to arrayed waveguide grating 205 via coupler 200. Detector array 300 may detect the optical signals and convert the optical signals from optical signals to electrical signals. RF frequency spectral analyzer array 305 may analyze the converted electrical signals to determine the RF subcarrier modulation applied to the carrier frequency. The detected RF subcarrier modulation represents the destination node IDs of the received packets. RF frequency spectral analyzer array 305 may provide the determined RF subcarrier modulation to processing unit 215 (e.g., digital signal processor 215) which, in turn, may perform a took up operation into look up table 255 to map the determined RF subcarrier modulation in a destination optical node of optical nodes 110-1 through 110-n.

Processing unit 215 of node y may determine whether a packet has been received in the current time slot that is destined for this node (node y) (block 810). The RF subcarrier modulation detected by RF frequency spectral analyzer array 305 in block 800 may identify node y as being a destination for a packet received in the current time slot. If no packet has been received in the current time slot that is destined for node y (NO—block 810), then the exemplary process may return to block 800 with the occurrence of a next time slot.

If a packet has been received in the current time slot destined for node y (YES—block 810), then processing unit 215 may adjust tunable optical filter 315 to a wavelength of the corresponding packet (block 820). Processing unit 215 may adjust tunable optical filter 315 to pass the wavelength of the optical signals associated with a packet received in the current time slot. Receiver 235 may detect and process the packet (block 830) and processing unit 215 may receive the packet from receiver 235 (block 840). Receiver 235 may detect the optical signals associated with the packet and convert the optical to corresponding electrical signals. Receiver 235 may additionally analog-to-digital convert the electrical signals to digital data. Receiver 235 may supply the digital data associated with the packet to processing unit 215. The exemplary process may return to block 800 with the occurrence of a next time slot.

The exemplary process of FIG. 8 may be repeated at optical node 110 for each time slot in a sequence of time slots.

Figure 9:
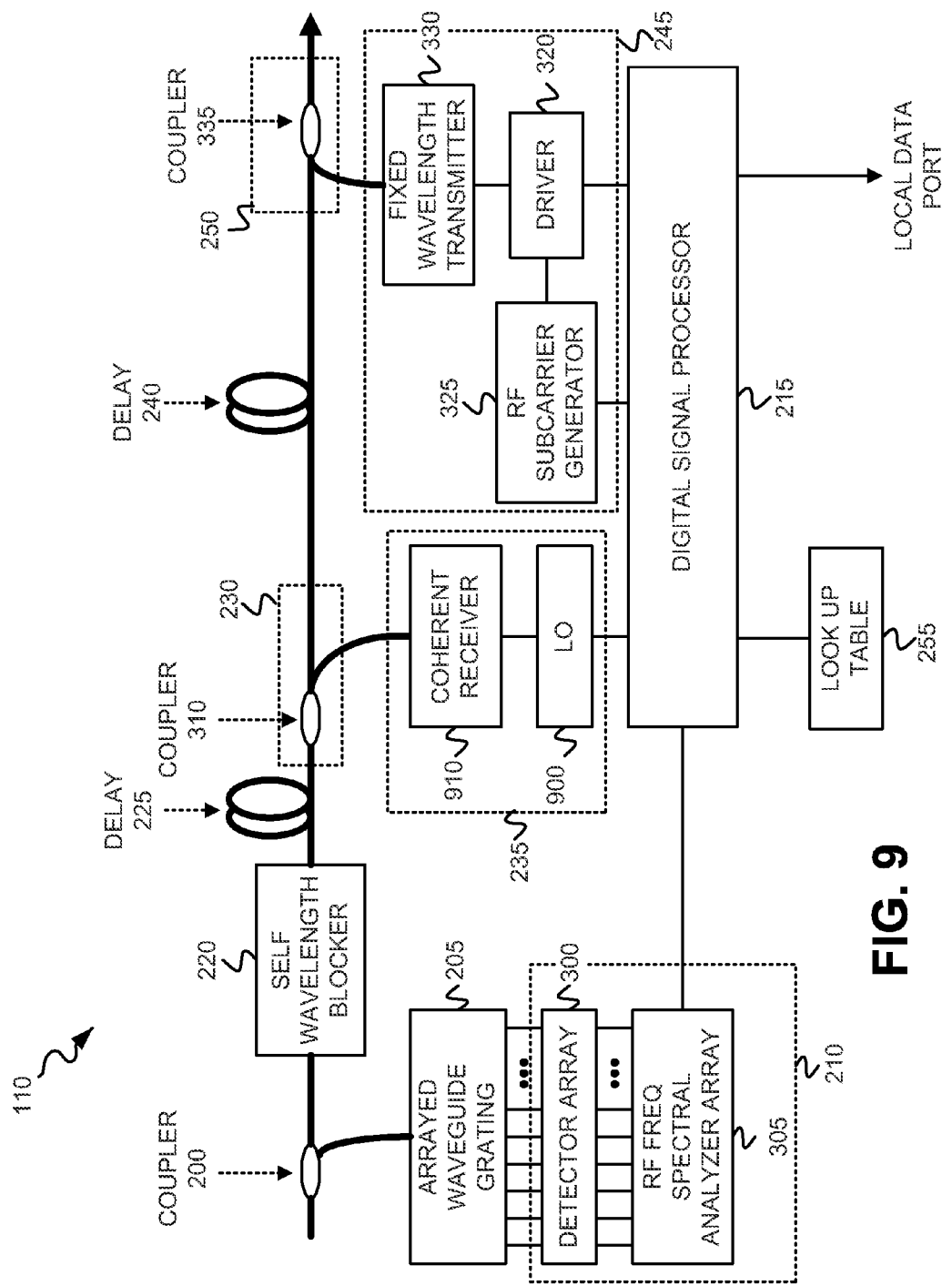
FIG. 9 depicts details of the optical node of FIG. 2 according to another exemplary implementation that uses coherent detection for receiving optical signals associated with packets destined for the optical node.

FIG. 9 depicts details of optical node 110 of FIG. 2 according to another exemplary implementation that uses coherent detection for receiving and detecting optical signals associated with packets destined for optical node 110. The exemplary implementation of FIG. 9 includes nearly identical components to those described with respect to FIG. 3 above, with receiver 235 comprising a local oscillator (LO) 900 and a coherent receiver 910. For coherent detection of packets, LO 900 can be tuned to the frequency/wavelength of the corresponding packet (re., the packet being received in the current time slot), and the LO frequency/wavelength can be applied to coherent receiver 910 for receiving the optical signals associated with the packet. The other components of optical node 110 shown in FIG. 9 operate similarly to the same components depicted in, and described above with respect to, FIG. 3.

Figure 10:
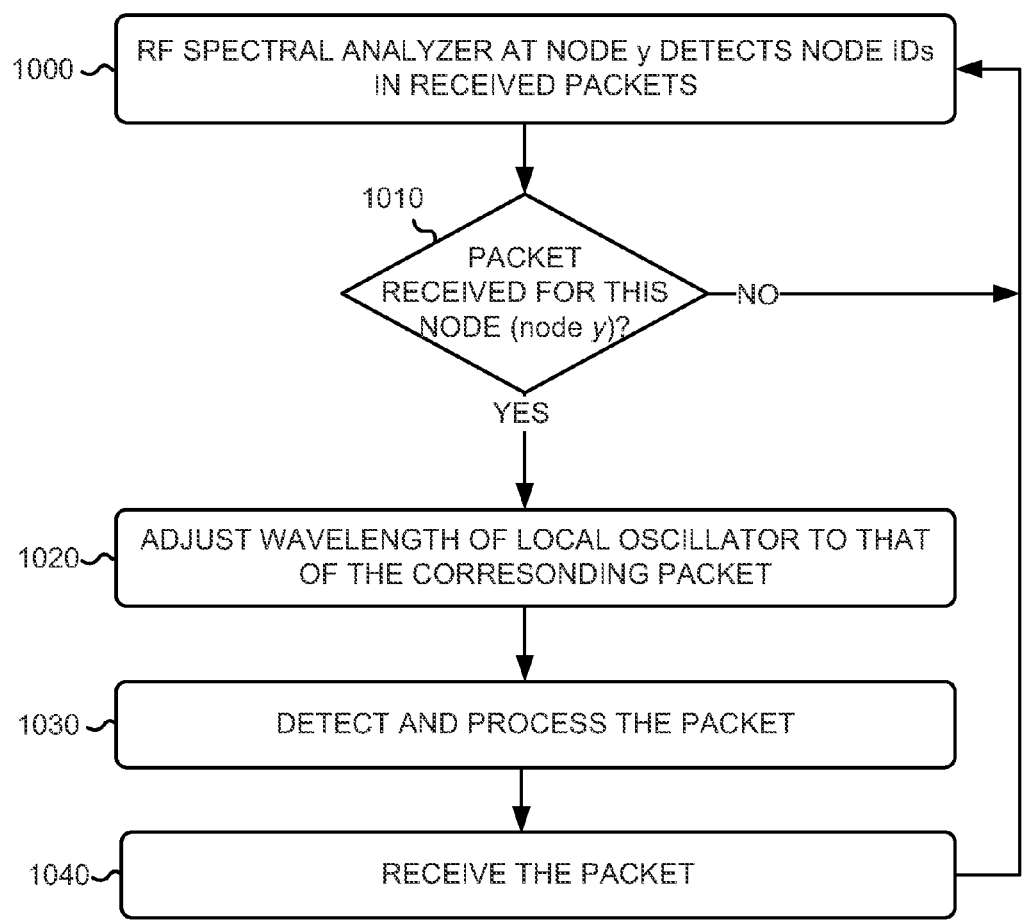
FIG. 10 is a flow diagram of an exemplary process for receiving packets at the optical node of FIG. 9 using coherent detection.

FIG. 10 is a flow diagram of an exemplary process for receiving packets at an optical node 110 using coherent detection. The exemplary process of FIG. 10 may be implemented by components of the exemplary implementation of optical node 110, as shown in FIG. 9, during a current time slot.

The exemplary process may include RF spectral analyzer array 305 of detector 210 of optical node 110 (node y) detecting node IDs in received packets (block 1000) during a current time slot. Optical signals associated with a packet may be received at optical node 110 during a time slot and supplied to arrayed waveguide grating 205 via coupler 200. Detector array 300 may detect the optical signals and convert the optical signals from optical signals to electrical signals. RF frequency spectral analyzer array 305 may analyze the converted electrical signals to determine the RF subcarrier modulation applied to the carrier frequency. The detected RF subcarrier modulation represents the destination node IDs of the received packets. RF frequency spectral analyzer array 305 may provide the determined RF subcarrier modulation to processing unit 215 (e.g., digital signal processor 215) which, in turn, may perform a look up operation into look up table 255 to map the determined RF subcarrier modulation to an optical node of optical nodes 110-1 through 110-n.

Processing unit 215 of node y may determine whether a packet has been received in the current time slot that is destined for this node (node y) (block 1010). The RE subcarrier modulation detected by RE frequency spectral analyzer array 305 in block 1000 may identify node y as being a destination for a packet received in the current time slot. If no has been received in the current time slot that is destined for node y (NO—block 1010), then the exemplary process may return to block 1000 with the occurrence of a next time slot. If a packet has been received in the current time slot destined for node y (YES—block 1010), then processing unit 215 may adjust the wavelength of LO 900 of node y to that of the corresponding packet (block 1020). Processing unit 215 may adjust LO 900 to the wavelength of the optical signals associated with a packet received in the current time slot.

Coherent receiver 910 may detect and process the packet (block 1030) and processing unit 215 may receive the packet from coherent receiver 910 (block 1040). Coherent receiver 910 may detect the optical signals associated with the packet and convert the optical to corresponding electrical signals. Coherent receiver 910 may additionally analog-to-digitally convert the electrical signals to digital data. Coherent receiver 910 may supply the digital data associated with the packet to processing unit 215. The exemplary process may return to block 1000 with the occurrence of a next time slot. The exemplary process of FIG. 10 may be repeated at optical node 110 for each time slot in a sequence of time slots.

Figure 11:
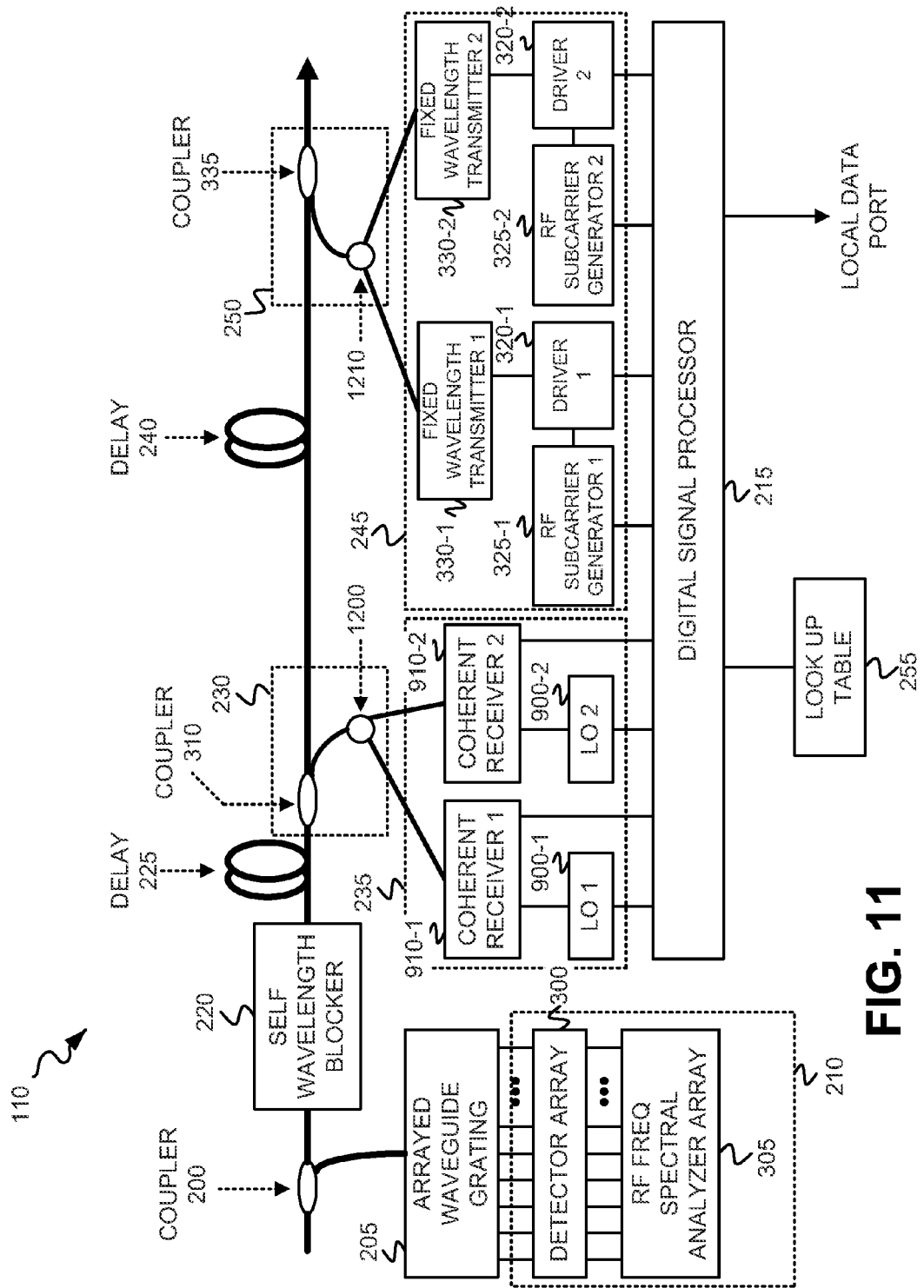
FIG. 11 depicts another exemplary implementation of the optical node of FIG. 2 where the optical node includes multiple fixed wavelengths for transmitting packets.

FIG. 11 depicts another exemplary implementation of optical node 110, where optical node 110 includes multiple fixed wavelengths for transmitting packets during a time slot. In the exemplary implementation of FIG. 11, coupler 310 may include an additional coupler 1100 for coupling optical signals to multiple coherent receivers 910-1 and 910-2, and multiple LOs 900-1 and 900-2 that connect to respective coherent receivers 910-1 and 910-2. Coherent receivers 910- and 910-2, based on inputs from LOs 900-1 and 900-2, permit optical lode 110 to receive and detect multiple different wavelengths/frequencies in a same time slot (e.g., two wavelengths/frequencies being depicted in FIG. 11). As further shown in FIG. 11, coupler 250 may include an additional coupler 1110 for coupling optical signals from fixed wavelength transmitter 1 330-1 and fixed wavelength transmitter 2 330-2 to the optical fiber connected to the output of optical node 110. RF subcarrier generators 325-1 and 325-2, drivers 320-1 and 320-2, and fixed wavelength transmitters 330-1 and 330-2 operate similarly to the description above with respect to FIG. 3, with fixed wavelength transmitter 330-1 transmitting optical signals associated with a packet at a first carrier frequency/wavelength and fixed wavelength transmitter 330-2 transmitting at a second, different carrier frequency/wavelength. Additionally, RF subcarrier generator 325-1 and driver 320-1 apply RF modulation to the optical signals transmitted from fixed wavelength transmitter 330-1 to send the corresponding packet in a time slot to a first destination optical node. RF subcarrier generator 325-2 and driver 320-2 apply RF modulation to the optical signals transmitted from fixed wavelength transmitter 330-2 to send the corresponding packet to a second destination optical node in the same time slot, where the second destination optical node may be the same or different than the first destination optical node.

Figure 12A:
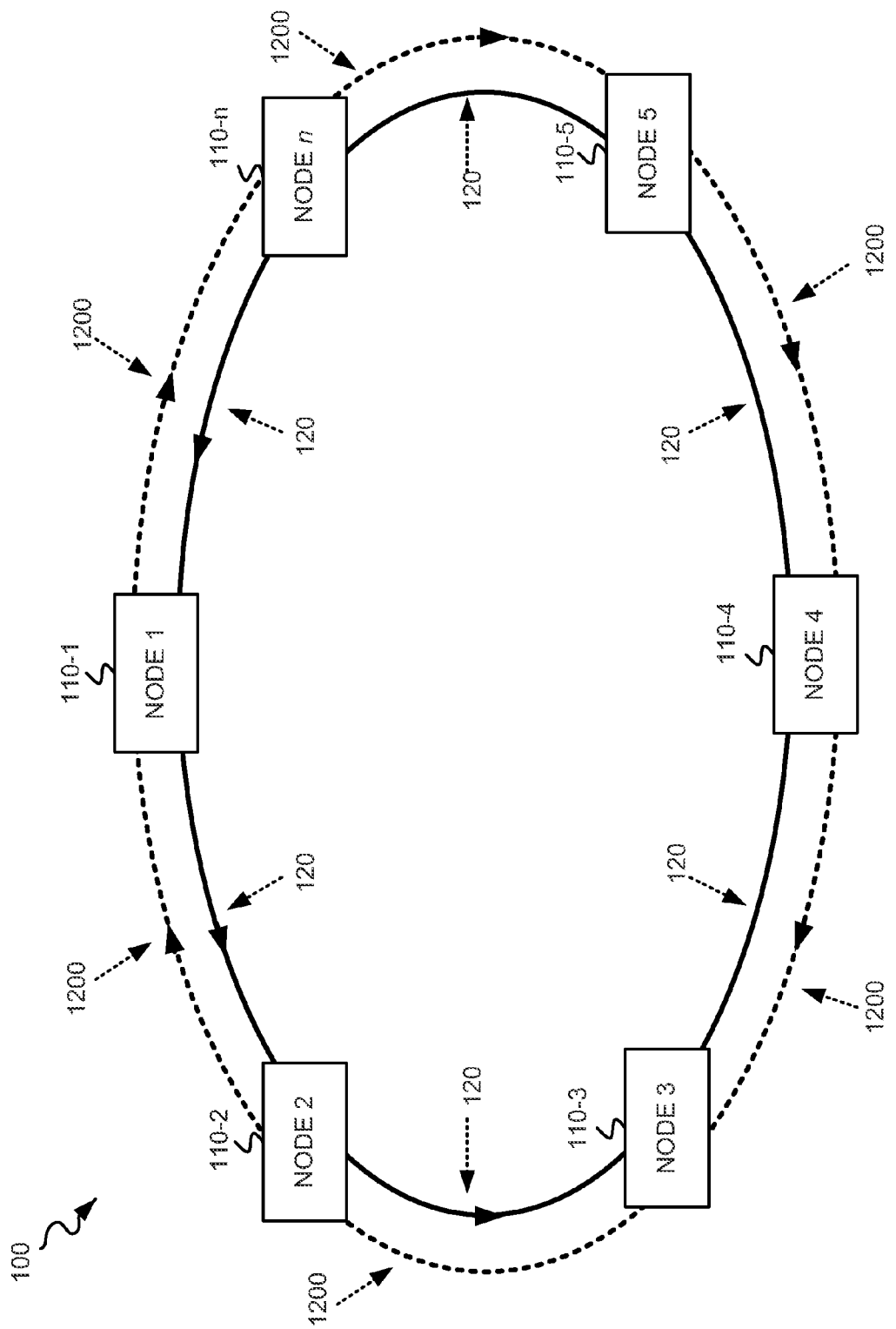
FIGS. 12A and 12B depict an exemplary implementation of the network environment of FIG. 1 in which the optical nodes are bidirectional, having two separate optical fiber rings for transmitting packets around the optical network.
Figure 12B:
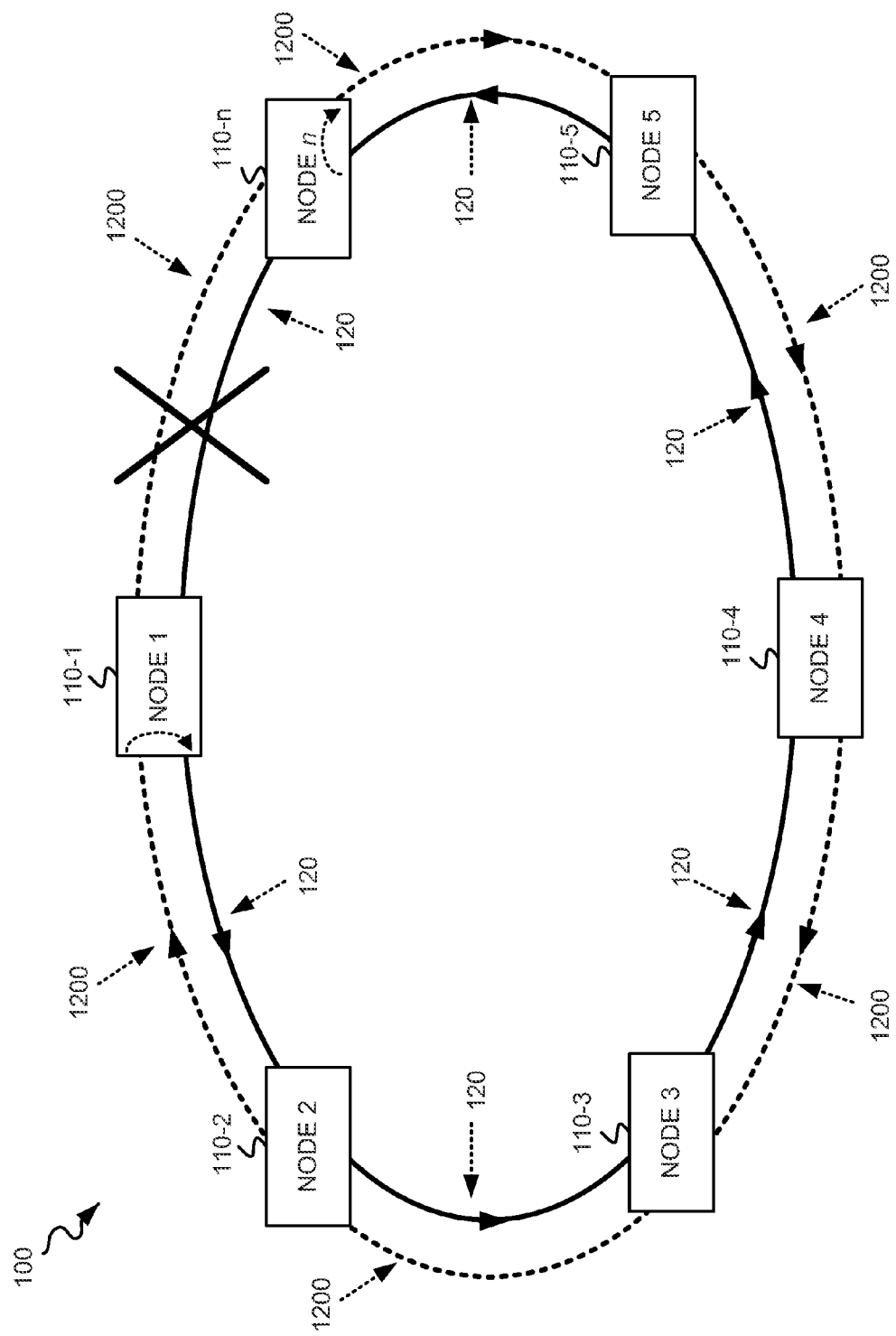

FIGS. 12A and 12B depict an exemplary implementation of network environment 100 in which optical nodes 110 are bidirectional, having two separate optical fiber rings for transmitting packets in two different directions around the optical ring network. The bidirectional network environment 100 may be used to increase the packet throughput of the network with packets being sent in each direction on the two separate optical fiber rings simultaneously. Additionally, the bidirectional network environment 100 may be used to ensure packet delivery in the event that one or both of the two optical fiber rings fails at a certain location along the ring network. FIG. 12A depicts packet transmission in a first direction around a first optical ring network having optical fibers 120 connected between nodes 110, and packet transmission in a second direction around a second optical ring network having optical fibers 1200 connected between nodes 110. FIG. 12B depicts an instance where the optical fiber has broken between node 110-1 and node 110-n, breaking the optical rings in both directions. In this case, both optical rings may be connected together as a single effective ring by node 110-1 and node 110-n such that optical signals continue to circulate in a ring-like fashion between nodes 110-1 through 10-n (e.g., node 110-1 to node 110-2 to node 110-3 to node 110-4 to node 110-5 to node 110-n, and then in the reverse direction from node 110-n to node 110-5 to node 110-4 to node 110-3 to node 110-2 to node 110-1).

FIG. 13 depicts an exemplary implementation of an optical node 110, used in the network environment shown in FIGS. 12A and 12B, which has bidirectional capability. The exemplary implementation of FIG. 13 includes similar components to that of FIG. 3, except with the addition of optical fiber inputs and outputs, and associated components, that carry optical signals in an opposite direction through optical node 110. These components include coupler 200-2, self wavelength blocker 220-2, delay fiber 225-2, coupler 310-2, delay fiber 240-2 and coupler 335-2, which operate similarly to the components of FIG. 3 except in an opposite direction to the components that include coupler 200-1, self wavelength blocker 220-1, delay fiber 225-1, coupler 310-1, delay fiber 240-1 and coupler 335-1.

Figure 14:
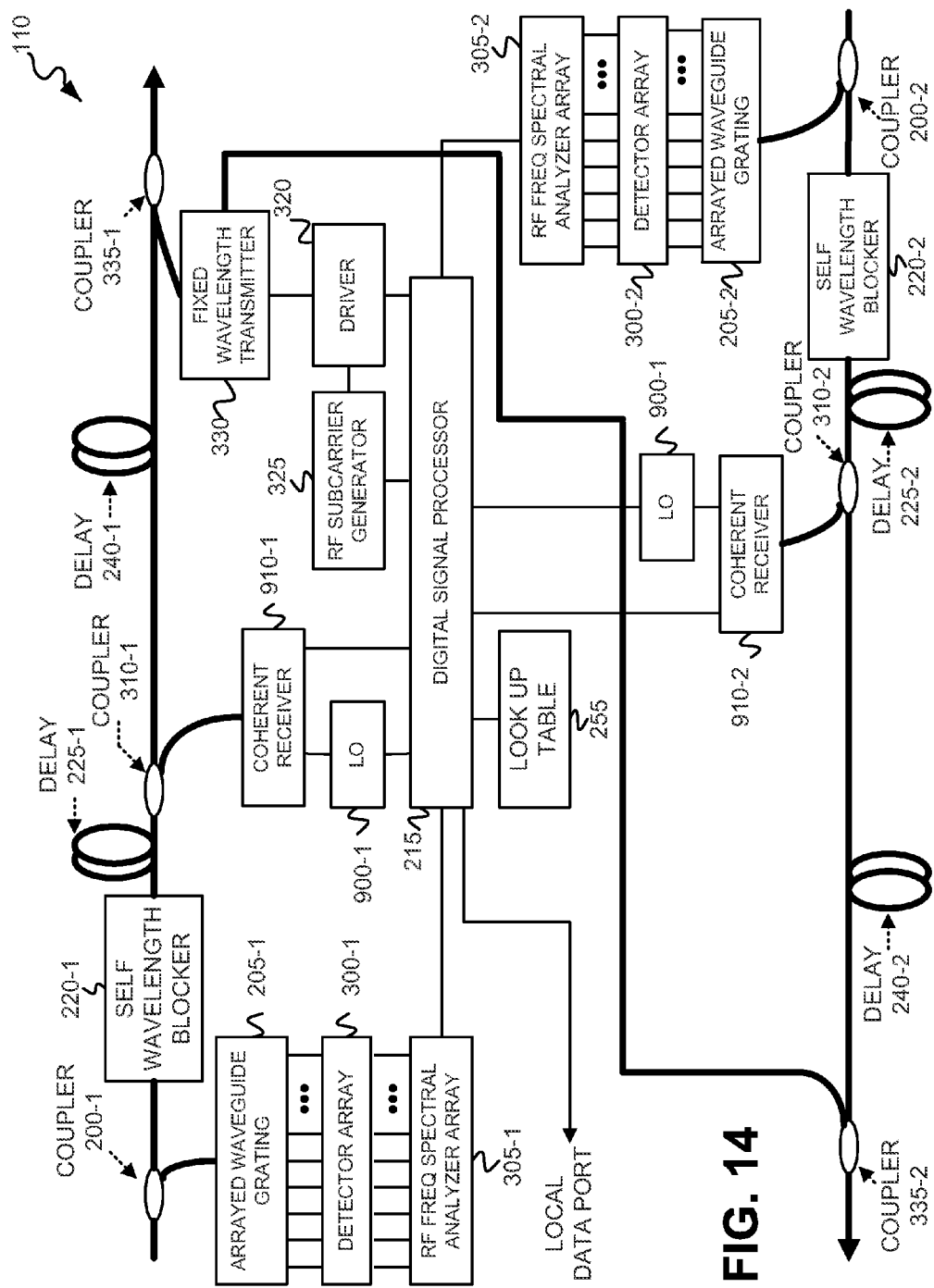
FIG. 14 depicts another exemplary implementation of the directional optical node of FIG. 13, where the optical node includes dual receivers and a single fixed wavelength transmitter.

FIG. 14 depicts another exemplary implementation of optical node 110, which has bidirectional capability, where optical node 110 includes dual receivers and a single fixed wavelength transmitter. The exemplary implementation of FIG. 14 includes similar components to that of FIG. 13, except with the addition of arrayed waveguide 205-2, detector array 300-2, RF frequency spectral analyzer array 305-2, LO 900-1 and coherent receiver 910-1. The exemplary implementation of FIG. 14, therefore, represents a single transmitter/dual receiver design in which optical signals may be detected and received during each time slot going in both directions through optical node 110. The exemplary implementation of FIG. 14 further permits optical signals corresponding to packets to be sent in two directions from fixed wavelength transmitter 330 during a time slot.

Figure 15:
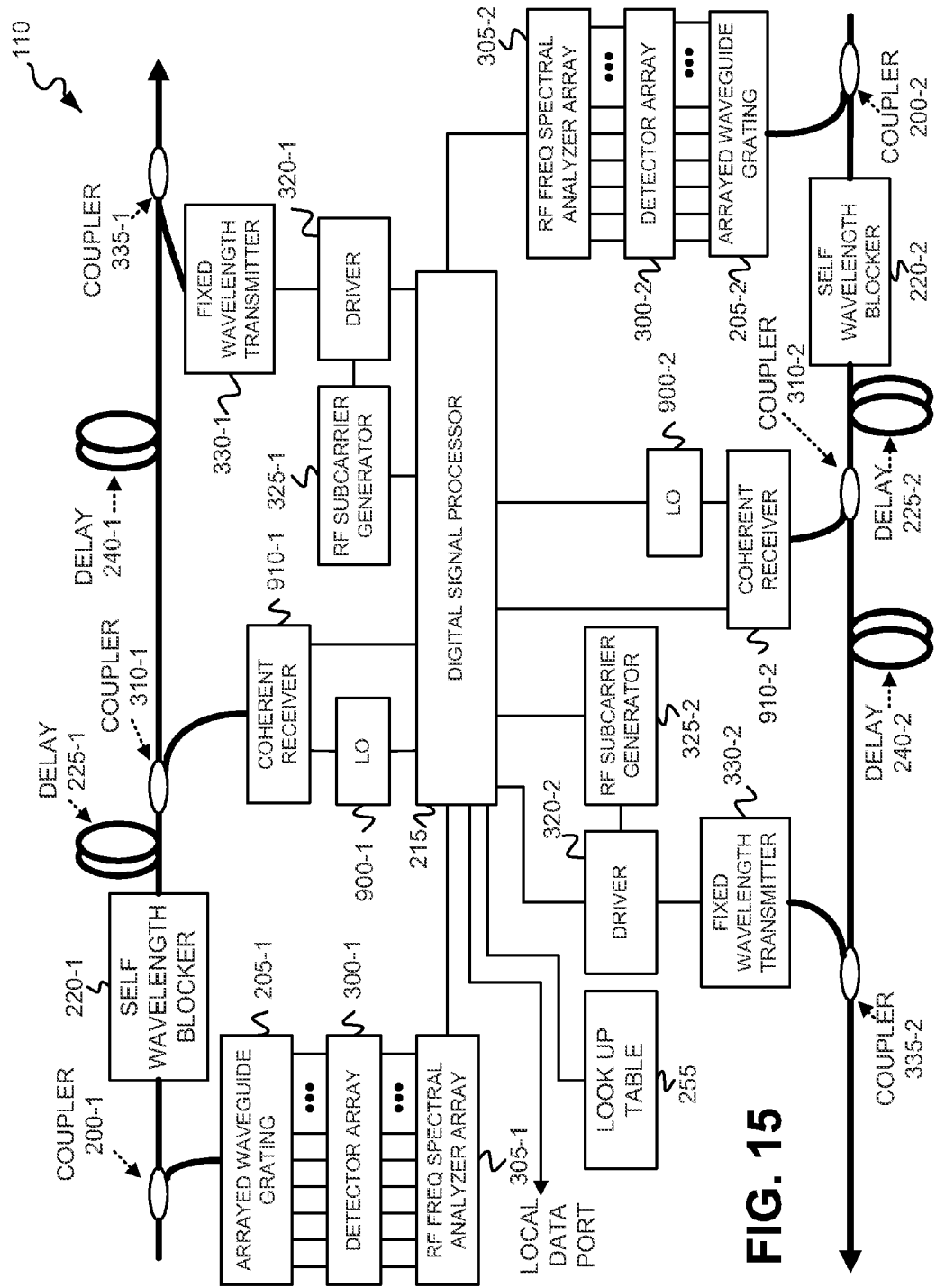
FIG. 15 depicts a further exemplary implementation of the directional optical node of FIG. 13, where the optical node includes dual receivers and dual fixed wavelength transmitters.

FIG. 15 depicts a further exemplary implementation of optical node 110, which has bidirectional capability, where optical node 110 includes dual receivers and dual fixed wavelength transmitters. This exemplary implementation differs from that of FIG. 14 in that an additional transmitter, comprising RF subcarrier generator 325-2, driver 320-2 and fixed wavelength transmitter 330-2, connects to a coupler 335-2 at the output of the additional directionality of bidirectional optical node 110. The additional transmitter permits optical node 110 of FIG. 15 to transmit at a first fixed wavelength from fixed wavelength transmitter 330-1 via coupler 335-1 during a time slot, and to transmit at a second fixed wavelength from fixed wavelength transmitter 330-2 via coupler 335-2 during the same time slot.

Figure 16:
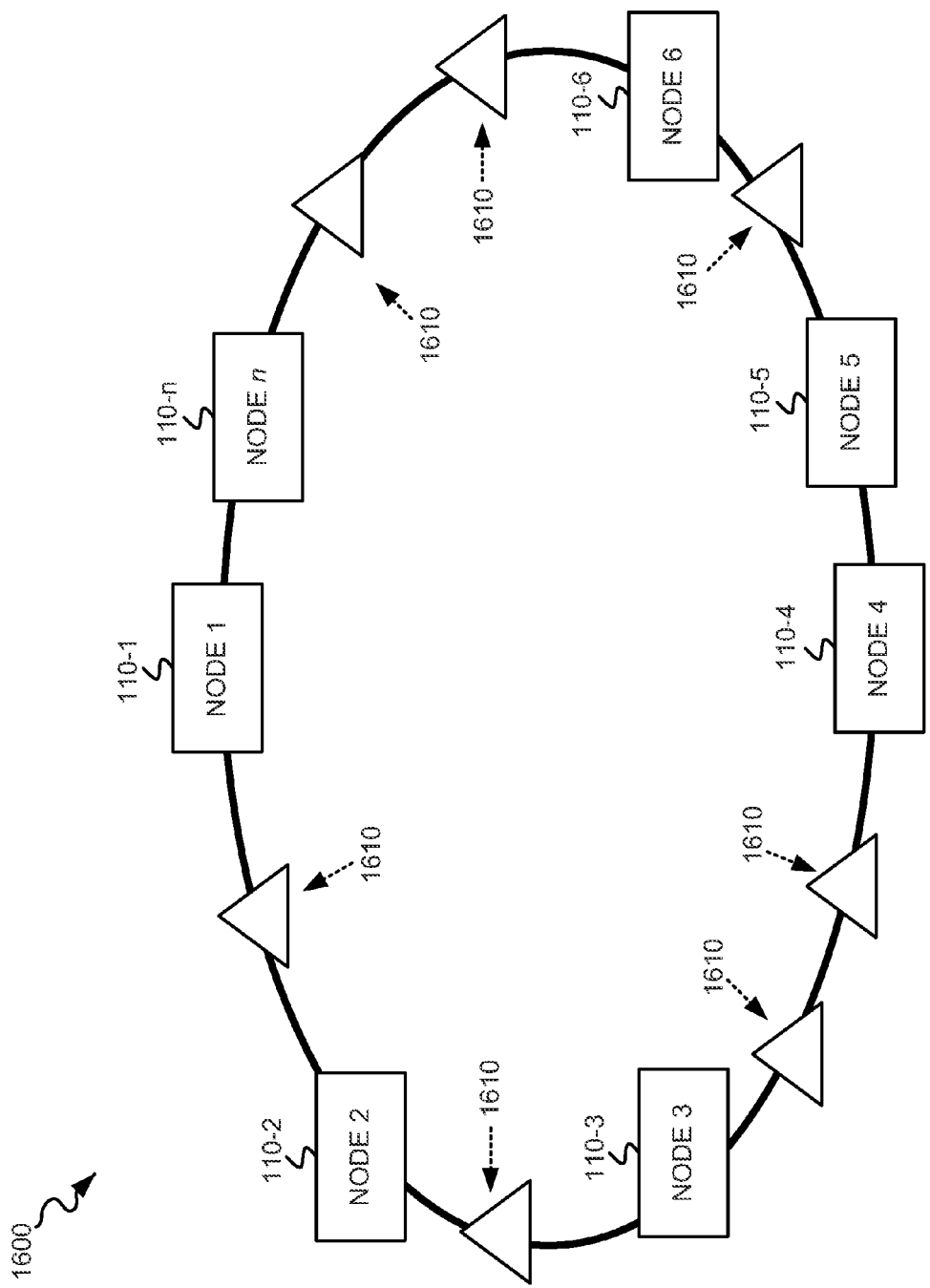
FIG. 16 depicts the use of the optical nodes of FIG. 1 in a large scale optical ring network environment that includes multiple amplifiers for amplifying the optical signals as they traverse lengthy segments of optical fiber.

FIG. 16 depicts the use of optical nodes 110, as described herein, in a large scale optical network environment 1600 that includes multiple amplifiers for amplifying the optical signals as they traverse lengthy segments of optical fiber. As shown in FIG. 16 multiple optical amplifiers 1610 may exist along the optical fibers connecting nodes 110-1 through 110-n. The fixed wavelengths used in transmitter 245 of optical nodes 110 permits stable optical amplification by amplifiers 1610 over the known and limited number of wavelengths. The stable optical amplification enables the use of optical nodes 110 over long-haul optical networks.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 7, 8, and 10, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A first optical node, comprising:
   a first optical coupler, connected to an input optical fiber of an optical network, and configured to split input optical signals, comprising multiple optical wavelengths and associated with incoming packets, into duplicate first and second optical signals, wherein the optical network comprises multiple optical nodes, including the first optical node and a plurality of other optical nodes;
   a wavelength splitter configured to split the first optical signals comprising the multiple optical wavelengths into separate outputs, with each of the separate outputs having a different wavelength of the multiple optical wavelengths;
   a detector configured to:
      detect the first optical signals associated with the incoming packets at each of the separate outputs, and
      determine a frequency of modulation applied to the first optical signals at each of the separate outputs;
   a second optical coupler, coupled in series with the first coupler, and configured to split the duplicate second optical signals from the first coupler into duplicate third and fourth optical signals and to pass the third optical signals to an output optical fiber connected to the first optical node;
   an optical receiver; and
   a processing unit configured to:
      identify a destination optical node, of the multiple optical nodes, for each of the incoming packets based on the determined frequency of modulation, and
      control the optical receiver to convert the fourth optical signals to electrical signals if the identified destination optical node comprises the first optical node.

2. The first optical node of claim 1, further comprising:
   a wavelength blocker, connected in series with the first optical coupler, and configured to block ones of the second optical signals having a specific optical wavelength.

3. The first optical node of claim 2, wherein the wavelength blocker is further coupled to a fiber delay and to an input of the second optical coupler and wherein a first output of the second optical coupler is coupled to the receiver.

4. The first optical node of claim 1, wherein the frequency of modulation applied to the first optical signals comprises a radiofrequency (RF).

5. The first optical node of claim 1, wherein the wavelength splitter comprises an arrayed waveguide grating and wherein the detector comprises a detector array and a radiofrequency (RF) spectral analyzer array.

6. The first optical node of claim 5, wherein the RF spectral analyzer array determines the frequency of modulation applied to the first optical signals at each of the separate outputs.

7. The first optical node of claim 1, further comprising:
   a tunable optical filter connected between the second optical coupler and the optical receiver.

8. The first optical node of claim 1, wherein the receiver comprises a local oscillator (LO) and a coherent receiver.

9. The first optical node of claim 1, further comprising:
   an optical transmitter;
   wherein the processing unit is further configured to control the optical transmitter to transmit an outgoing packet to a destination optical node of the plurality of other optical nodes based on the identified destination optical node for each of the incoming packets detected by the detector; and
   a packet add unit configured to couple the transmitted outgoing packet to the output optical fiber.

10. The first optical node of claim 9, wherein the packet add unit comprises a third coupler.

11. The first optical node of claim 9, wherein the optical transmitter comprises:
    a radiofrequency (RF) subcarrier generator;

a driver; and
a fixed wavelength optical transmitter.

12. A first optical node, comprising:
a detector configured to detect input optical signals, and a frequency of modulation applied to the detected optical signals, received via an input optical fiber during a first timeslot;
an optical transmitter; and
a processing unit configured to:
   identify the detection of the input optical signals, indicative of receipt of an incoming packet, during the first timeslot,
   cause the optical transmitter to transmit outgoing optical signals associated with an idle packet, via an output optical fiber, if the input optical signals are detected during the first timeslot and the frequency of modulation indicates that the incoming packet is destined for another optical node in an optical network, and
   cause the optical transmitter to add a second frequency of modulation to output optical signals, corresponding to an outgoing packet, if the input optical signals are not detected during the first timeslot, indicating no incoming packet being received during the first timeslot, wherein the second frequency of modulation corresponds to a destination second optical node in the optical network.

13. The first optical node of claim 12, wherein the input optical signals comprise a plurality of first optical wavelengths and the output optical signals comprise a second optical wavelength that is different than the plurality of first optical wavelengths.

14. The first optical node of claim 12, wherein the optical transmitter comprises:
a subcarrier generator;
a driver; and
a fixed wavelength transmitter,
wherein the processing unit is further configured to:
   determine the destination second optical node for the outgoing packet,
   determine the second frequency of modulation based on the destination second optical node for the outgoing packet, and
   cause the subcarrier generator and the driver to apply the second frequency of modulation to the output optical signals transmitted by the fixed wavelength transmitter.

15. The first optical node of claim 12, further comprising:
a wavelength splitter configured to split the input optical signals, comprising multiple optical wavelengths, into separate outputs, with each of the separate outputs having a different wavelength of the multiple optical wavelengths,
wherein the detector comprises a detector array and a frequency spectral analyzer array and, when detecting the input optical signals possibly received via the input optical fiber during the first timeslot, the detector array is configured to:
   detect the input optical signals from each of the separate outputs of the wavelength splitter,
   convert the input optical signals to electrical signals, and
   output the electrical signals via separate detector outputs corresponding to each of the multiple optical wavelengths; and
wherein the frequency spectral analyzer array is configured to analyze the electrical signals received via the separate detector outputs to determine the frequency of modulation applied to the electrical signals.

16. The first optical node of claim 12, further comprising:
a first optical coupler, connected to an input optical fiber of an optical network, and configured to split the input optical signals, comprising multiple optical wavelengths and associated with incoming packets, into duplicate first and second input optical signals, wherein the optical network comprises multiple optical nodes, including the first optical node and a plurality of other optical nodes, and wherein the detector is configured to detect the first input optical signals.

17. The first optical node of claim 16, further comprising:
a second optical coupler, coupled in series with the first coupler, and configured to split the duplicate second input optical signals from the first coupler into duplicate third and fourth input optical signals and to pass the third input optical signals to the output optical fiber connected to the first optical node.

18. The first optical node of claim 17, further comprising:
a third optical coupler, coupled in series with the second optical coupler, and configured to couple the idle packet or the outgoing packet to the output optical fiber.

19. A first optical node, comprising:
a first optical coupler, connected to an input optical fiber of an optical network, and configured to split input optical signals, comprising multiple optical wavelengths and associated with incoming packets, into duplicate first and second optical signals, wherein the optical network comprises multiple optical nodes, including the first optical node and a plurality of other optical nodes;
a wavelength splitter configured to split the first optical signals comprising the multiple optical wavelengths into separate outputs, with each of the separate outputs having a different wavelength of the multiple optical wavelengths;
a detector configured to:
   detect the first optical signals associated with the incoming packets at each of the separate outputs, and
   determine a frequency of modulation applied to the first optical signals at each of the separate outputs, wherein the frequency of modulation applied to the first optical signals comprises a radiofrequency (RF);
a second optical coupler, coupled in series with the first coupler, and configured to split the duplicate second optical signals from the first coupler into duplicate third and fourth optical signals and to pass the third optical signals to an output optical fiber connected to the first optical node;
an optical receiver, wherein the optical receiver comprises a local oscillator (LO) and a coherent receiver; and
a processing unit configured to:
   identify a destination optical node, of the multiple optical nodes, for each of the incoming packets based on the determined frequency of modulation, and
   control the optical receiver to convert the fourth optical signals to electrical signals if the identified destination optical node comprises the first optical node.

20. The first optical node of claim 19, further comprising:
an optical transmitter;
wherein the processing unit is further configured to control the optical transmitter to transmit an outgoing packet to a destination optical node of the plurality of other optical nodes based on the identified destination optical node for each of the incoming packets detected by the detector; and
a packet add unit configured to couple the transmitted outgoing packet to the output optical fiber.

21. The first optical node of claim 20, wherein the optical transmitter comprises:
   a radiofrequency (RF) subcarrier generator;
   a driver; and
   a fixed wavelength optical transmitter.

* * * * *